UNITED STATES PATENT OFFICE.

GEORGE MEADE FORD, OF MONTREAL, QUEBEC, CANADA.

COMPOSITION FOR PLASTERING.

SPECIFICATION forming part of Letters Patent No. 420,008, dated January 21, 1890.

Application filed June 12, 1889. Serial No. 314,051. (No specimens.) Patented in Canada July 19, 1889, No. 31,757.

*To all whom it may concern:*

Be it known that I, GEORGE MEADE FORD, builder, of the city of Montreal, in the Province of Quebec, in the Dominion of Canada, have invented a new and useful Composition of Matter for Plastering Purposes, suitable for all kinds of plastering, plain and ornamental, for paneling of walls, decorations of ceilings and halls, and stucco walls, (for which I have received Letters Patent in Canada, No. 31,757, dated July 19, 1889;) and I do hereby declare that the following is a full, clear, and exact description of the same.

The nature of this invention consists of the mixing of air-slaked lime, plaster-of-paris, river sand, and cow-hair with serum or the watery part of the blood of animals with carbolic acid, as follows:

Take of air-slaked lime one part, of plaster-of-paris two parts, of river sand (washed) one part, and of washed well-beaten cow-hair one-tenth part, the whole to be well mixed and incorporated together, and then saturated with serum, to which is added a sufficient quantity of carbolic acid to purify it, the whole to form a plastic paste or plaster having the consistency of mortar generally used for plastering purposes.

This composition is more durable, harder, and more economical than any plastering now in use.

What I claim as my invention, and desire to secure by Letters Patent, is—

A new and useful composition of matter for plastering purposes, consisting of a mixture of air-slaked lime, plaster-of-paris, river sand, and cow-hair mixed with serum purified with carbolic acid, substantially in the proportions and for the purposes set forth.

Montreal, June 8, 1889.

GEORGE MEADE FORD.

In presence of—
AVILA THOMAS,
L. H. DUPUIS.